Feb. 10, 1925.

E. J. BAIRD

POULTRY FEEDER

Filed Dec. 27, 1920

1,525,562

INVENTOR.

Everett J. Baird

Patented Feb. 10, 1925.

1,525,562

UNITED STATES PATENT OFFICE.

EVERETT J. BAIRD, OF WORCESTER, MASSACHUSETTS.

POULTRY FEEDER.

Application filed December 27, 1920. Serial No. 433,442.

*To all whom it may concern:*

Be it known that I, EVERETT J. BAIRD, a citizen of the United States, residing at the city of Worcester, in the county of Worcester and State of Massachusetts, have invented new and useful Improvements in Poultry Feeders, of which the following is a specification.

This invention relates to improvements in poultry feeders and has for its object to provide a simple inexpensive and highly efficient poultry feeder so shaped, arranged and constructed as to permit all the parts to be readily collapsed and disjointed.

Another object of my invention is to provide an improvement in poultry feeders of a type wherein a pan is adapted to slide in and out of a lateral opening formed in a cage, my present improvement being directed to render the parts of the cage collapsible into a small mass suitable for transportation purposes.

With the above and other objects in view my invention consists in the combination, arrangement and details of construction disclosed in the drawings and specification and then more particularly pointed out in the appended claims.

In the drawings as shown similar reference characters designate similar parts throughout the respective views.

Figure 1:
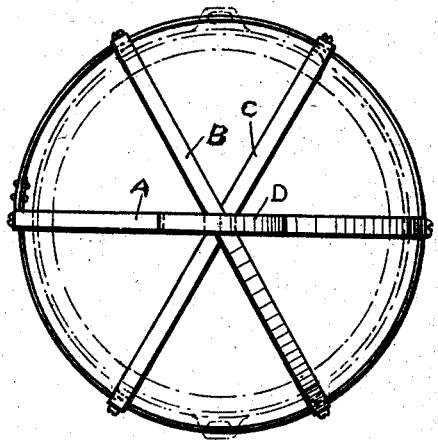
Fig. 1 is a top view assembled.
Figure 2:
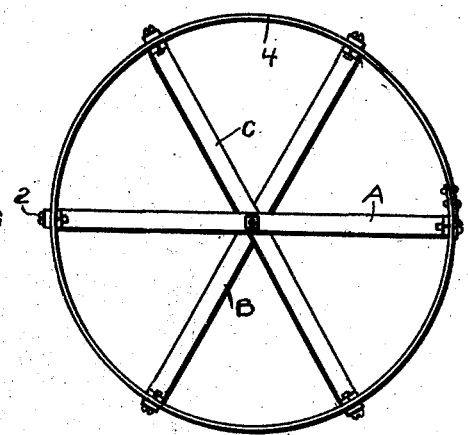
Fig. 2 is a view looking from underneath my improved poultry feeder.

In the drawings which are merely illustrative of my invention 1 and 2 designate suitable fasteners such as stove bolts or rivets, adapted to removably secure a plurality of steel strips A—B—C in position against bands 4 and 4'. The lowermost band or ring 4 is constructed to constitute a base and pan receiving member.

Figure 3:
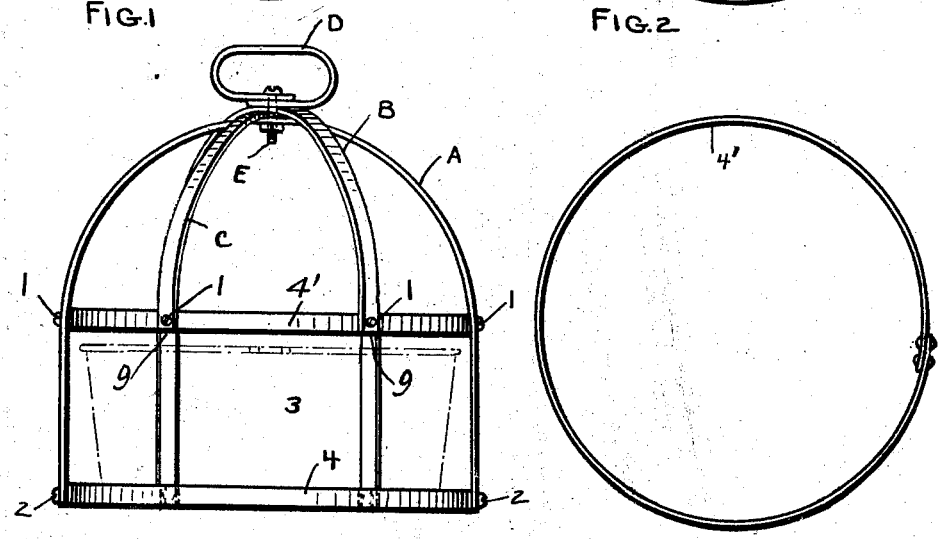
Fig. 3 is a front elevation.
Figure 4:
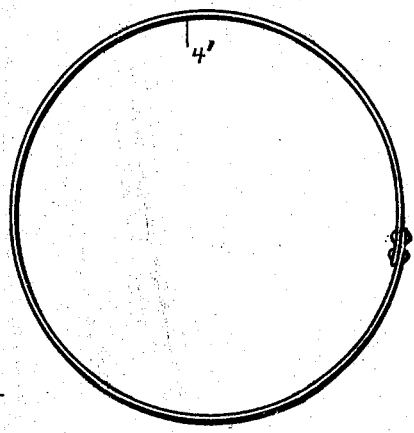
Fig. 4 is a view of an assembling band removed from the feeder.

The three strips A—B—C are severally inverted U shaped members the strip A having its opposing legs of uniform lengths, the strips B and C having one of the legs the same length as one of the legs of strip A, but the other leg of B and C terminating at points 9 considerably above the terminals of the other leg of the inverted U shaped strip A. All of these inverted U shaped strips are arranged in an overlapping position and there is a vertical pivot bolt E passing through all of the bight portions of these overlapping strips while a loop handle D is also connected to this pivot bolt, all as is shown in Figs. 3 and 5.

The bolts 1 and 2 removably secure the strips A—B—C in their open spread apart position to bands 4' and 4 as shown in the Figures 1, 2, 3 and 6.

Figure 6:
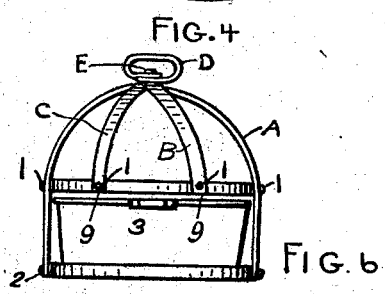
Fig. 6 is a front elevation of the feeder, showing a feeding pan therein.

The band 4 is removably secured to the terminals of the long legs of the inverted U shaped strips A—B—C, while the band 4' is removably secured to the terminals of the short legs of the inverted U shaped strips B and C as well as midway of the long legs of the strips A B and C at a point considerably above the terminals of the strip A and also above the terminals of the long legs of B and C. This leaves a lateral opening within the cage composed of these U shaped strips and bands wherein is adapted to slide in and out a pan as shown in Figures 3 and 6.

Figure 5:
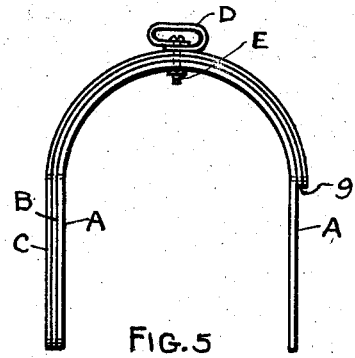
Fig. 5 is a side view of the parts of the cage collapsed, omitting the assembling bands.

It will readily be seen that when the bolts 1 and 2 are removed from the cage the section or strips A, B and C will be mounted together upon the pivot E with handle D so they can be swung freely about this pivot into an overlapping position as shown in Figure 5. In this collapsed position they will occupy but a small compass and will be rendered more suitable for transportation purposes.

Numerous modifications may be made in principles without departing from the principles of construction disclosed herein.

What I desire to claim and secure by Letters Patent is:—

1. In a device as described, a collapsible cage consisting of a plurality of U-shaped members having legs of different lengths, said members being adapted to rest one within the other when the cage is collapsed, and being adapted to be held apart by rigid members secured to the ends of the legs in different planes when the cage is assembled.

2. As a new article of manufacture an overlapping series of inverted U-shaped members similar in design and shape, certain of said members being shortened in respect to the terminals of adjacent members, a common pivot connecting the several bight portions of said members, a handle also connected to said pivot, said members adapted to spread out in a circular series about said pivot, and vertically spaced apart rings secured in detachable relation against the opposing legs of adjacent and different members.

3. A device as described consisting of a concentric series of overlapping inverted U-shaped members arranged and adapted to open and close, said members when open adapted to be separated circumferentially, and horizontally-disposed means engaging all of said members at two points for holding said members in separated relation and against closing, some of said members being cut away between the aforementioned two points.

4. A device as described, consisting of a concentric series of inverted U-shaped members, a common pivot for all of said members allowing them to be closed to an overlapping aligning series and also to be opened and spread apart, and a plurality of circular rings removably secured in vertically spaced apart relation to said members, giving circular form to the position of said members and holding them against displacement from separate relationship, said members between the two rings being disposed vertically.

5. A feeder consisting of a concentric series of inverted U-shaped members certain of which have one limb of its set of limbs shortened, means whereby said members may open and close upon each other from and to overlapping alining position, and an endless band removably holding said members in separated relation and also engaging the terminals of the shortened limbs, and another band removably secured to all of said members at their lowermost ends.

6. A device as described, consisting of a pair of vertically spaced apart comparatively rigid circular endless bands arranged in horizontal position, an overlapping aligning series of inverted U-shaped rungs, a pivot passing centrally through all of said rungs, said rungs adapted to be spaced apart circumferentially so that their limbs may straddle both of said bands circumferentially thereof, and means for removably securing the several rungs to said bands.

7. In combination a series of overlapping inverted U-shaped members, a pivot centrally connecting said members and enabling the latter to spread apart in separated relation, a pair of vertically spaced apart bands removably secured to the sides of said members and designed to hold them in separated relation and a handle secured to said pivot in engagement with the uppermost of said members, certain of said members throughout one half of the circumference of said bands being cut away from a point midway the uppermost limits of said members down towards the lowermost band thereby providing a lateral opening for the insertion of a pan.

8. A device as described consisting of a series of arch-shaped members looped over one another, a pivot securing the looped-over portions of said members together in swinging relation, a band to which some of said members are secured between their ends and others at their lower ends.

In witness whereof he has hereunto set his hand this 22nd day of December, 1920.

EVERETT J. BAIRD.

Witnesses:
 WILLIAM E. BAFF,
 HARRY BUBRANDOUX.